(12) United States Patent
Shveidel et al.

(10) Patent No.: US 12,405,883 B1
(45) Date of Patent: Sep. 2, 2025

(54) MANAGING DECREF PROCESSING FROM TABLETS CONTAINING SORTED BUCKETS

(71) Applicant: Dell Products L.P., Round Rock, TX (US)

(72) Inventors: Vladimir Shveidel, Pardes Hana-Karkur (IL); Jenny Derzhavetz, Raanana (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/644,361

(22) Filed: Apr. 24, 2024

(51) Int. Cl.
*G06F 12/02* (2006.01)

(52) U.S. Cl.
CPC ................ *G06F 12/0246* (2013.01)

(58) Field of Classification Search
None
See application file for complete search history.

(56) References Cited

U.S. PATENT DOCUMENTS

| 11,068,199 | B2 | 7/2021 | Shveidel et al. |
| 2007/0208251 | A1 | 9/2007 | Anderson et al. |
| 2022/0342825 | A1 | 10/2022 | Derzhavetz et al. |

OTHER PUBLICATIONS

Derzhavetz, Jenny, et al.; "Processing Metadata Changes Using Multiple Aggregation Policies," U.S. Appl. No. 18/494,196, filed Oct. 25, 2023.
Derzhavetz, Jenny, et al.; "Bypass Destaging of Decrement Reference Count Operations With Delta Log Based Architecture," U.S. Appl. No. 18/210,355, filed Jun. 15, 2023.
Derzhavetz, Jenny, et al.; "System and Method for Lockless Reading of Metadata Pages"; U.S. Appl. No. 17/237,398, filed Apr. 22, 2021.
Derzhavetz, Jenny, et al.; "Techniques Using a Variable Size Extension Area With Two Phase Destaging," U.S. Appl. No. 18/141,722, filed May 1, 2023.
Dovzhenko, Denis, et al.; "Managing Metadata of Variable Length Using Metadata Pages and Delta Records of Transaction Log," U.S. Appl. No. 18/069,331, filed Dec. 21, 2022.
Shveidel, Vladimir, et al.; "Destaging Metadata Changes Using Read Locks," U.S. Appl. No. 18/414,632, filed Jan. 17, 2024.
Shveidel, Vladimir, et al.; "System and Method for Aggregating Metadata Changes in Storage System"; U.S. Appl. No. 16/260,660, filed Jan. 29, 2019.
Shveidel, Vladimir; "Smooth Metadata Pages Stream to Raid Blocks in Log Structured Metadata Based Storage Cluster," U.S. Appl. No. 18/626,531, filed Apr. 4, 2024.

*Primary Examiner* — Kevin Verbrugge
(74) *Attorney, Agent, or Firm* — BainwoodHuang

(57) ABSTRACT

A technique for managing reference-count decrements (decrefs) includes defining an aggregation domain that includes multiple tablets created at respective points in time, each of the tablets containing multiple sorted buckets arranged in a respective sequence of bucket identifiers that is repeated across all of the tablets, the sorted buckets containing decrefs for respective sets of metadata pages. The technique further includes assigning a decref job to a specified set of bucket identifiers and destaging, by the decref job, multiple decrefs from the tablets to persistent metadata pages, beginning with decrefs in buckets having the specified set of bucket identifiers and proceeding until a target number of decrefs has been destaged.

20 Claims, 6 Drawing Sheets

MANAGING DECREF PROCESSING FROM TABLETS CONTAINING SORTED BUCKETS

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Data storage systems commonly use block sharing for supporting deduplication, snapshots, and the like. In a typical arrangement, logical blocks of various files or volumes point to virtual blocks, which in turn point to physical blocks where data are stored. Because of block sharing, multiple logical blocks may point to the same virtual block. Each virtual block may have a reference count, which counts the number of logical blocks that point to it. A reference count for a virtual block may be incremented in response to copies, new snapshots, and the like, and it may be decremented in response to deletes, for example. Reference count decrements may be referred to herein as "decrefs." Once the reference count for a virtual block reaches zero, the associated physical block is no longer being used and the space occupied by the physical block can be reclaimed.

Commercial storage systems produce huge numbers of decrefs in the course of their normal activities. To implement these decrefs, a storage system may process decrefs in batches. In one arrangement, the storage system adds newly-created decrefs to pages in a decref bin. When resources in the storage system become available, the storage system fetches a number of pages from the decref bin and begins processing them, e.g., by modifying virtual blocks to reflect updated reference counts as indicated by the decrefs in the fetched pages.

SUMMARY

Certain embodiments are directed to a method of managing reference-count decrements (decrefs). The method includes defining an aggregation domain that includes multiple tablets created at respective points in time, each of the tablets containing multiple sorted buckets arranged in a respective sequence of bucket identifiers that is repeated across all of the tablets, the sorted buckets containing decrefs for respective sets of metadata pages. The method further includes assigning a decref job to a specified set of bucket identifiers and destaging, by the decref job, multiple decrefs from the tablets to persistent metadata pages, beginning with decrefs in buckets having the specified set of bucket identifiers and proceeding until a target number of decrefs has been destaged.

In some examples, destaging multiple decrefs from the tablets includes merging decrefs from buckets having a particular bucket identifier across at least some of the tablets and updating one or more metadata pages based on the merged decrefs.

In some examples, the decref job is a first decref job, and merging decrefs from the buckets having the particular bucket identifier includes ending the first decref job after merging fewer than all buckets having the particular bucket identifier, in response to the target number of decrefs being reached, and starting a second decref job configured to merge remaining buckets having the particular bucket identifier that were not merged by the first decref job.

In some examples, destaging, by the decref job, multiple decrefs from the tablets includes completely destaging decrefs from all buckets for each bucket identifier processed by the decref job.

In some examples, completely destaging all decrefs for each bucket identifier processed by the decref job causes the target number of decrefs to be exceeded, and the method further includes providing feedback to a system scheduler, the feedback indicating a number of decrefs actually destaged by the decref job and enabling the scheduler to compensate when scheduling future jobs.

In some examples, the set of bucket identifiers includes a plurality of bucket identifiers, and destaging, by the decref job, multiple decrefs includes operating multiple destagers in parallel.

In some examples, the method further includes tracking an average aggregation of decrefs for each tablet and adjusting the number of tablets in the aggregation domain to achieve a desired level of aggregation.

In some examples, the aggregation domain includes a number of tablets that is determined based at least in part on an average aggregation of decrefs achieved during one or more previous destaging operations of previously created tablets.

In some examples, the number of tablets in the aggregation domain is further based at least in part on an amount of free space in a decref storage tier configured to store tablets awaiting destaging.

In some examples, the method is operated in a data storage system, and the number of tablets in the aggregation domain is further based at least in part on an amount of free space in the data storage system.

In some examples, the method is operated in a data storage system, and the method further includes establishing a desired number of tablets in the aggregation domain and, before the desired number of tablets has been created, triggering an early destage from the tablets already created, based on a condition of the data storage system.

In some examples, the condition of the data storage system includes host I/O requests received by the data storage system being idle.

In some examples, the early-destage is triggered based at least in part on an amount of free storage space in the data storage system falling below a low-water mark.

In some examples, the data storage system runs a set of other background jobs that have dependencies on the decref job, and the early-destage is triggered based at least in part on an amount of processing debt from the set of other background jobs exceeding a high-water mark.

Other embodiments are directed to a computerized apparatus constructed and arranged to perform a method of managing reference-count decrements (decrefs), such as the method described above. Still other embodiments are directed to a computer program product. The computer program product stores instructions which, when executed on control circuitry of a computerized apparatus, cause the computerized apparatus to perform a method of managing reference-count decrements (decrefs), such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Figure 1:
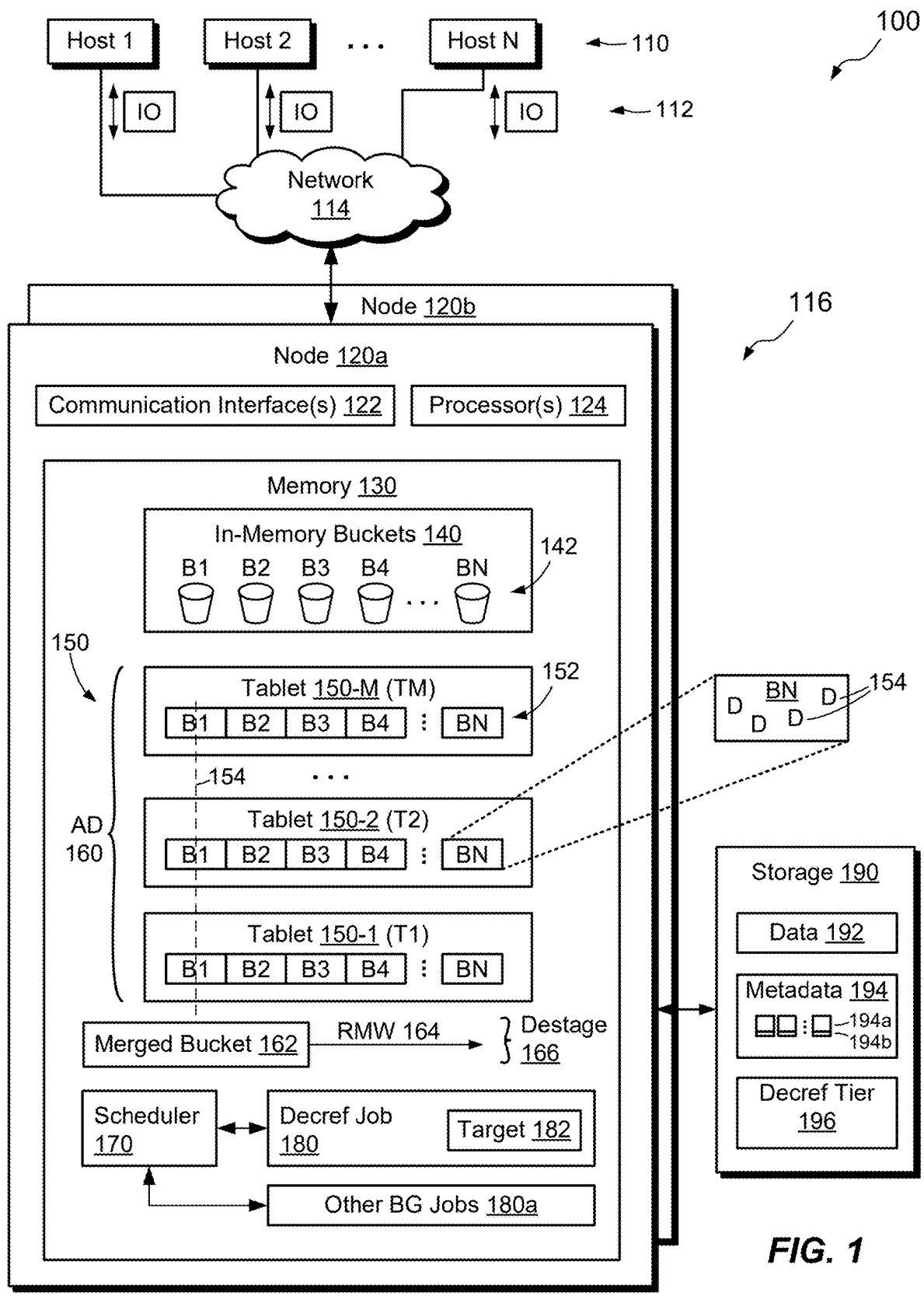
FIG. 1 is a block diagram of an example environment in which embodiments of the improved technique can be practiced.

Embodiments of the improved technique will now be described. One should appreciate that such embodiments are provided by way of example to illustrate certain features and principles but are not intended to be limiting.

Continuing developments in storage-system technology have replaced the decref bin with persistent tablets. The tablets store decrefs in sorted buckets arranged based on virtual blocks. A storage system creates the tablets from in-memory buckets, which receive decrefs as the storage system produces them. Different tablets capture decrefs collected by the in-memory buckets during respective intervals of time. Altogether, the tablets capture decrefs accumulated over an extended period of time and allow decrefs for virtual blocks to be aggregated before writing them to disk. When the virtual blocks are stored in flash drives, such aggregation extends the lifetime of the flash drives by reducing the number of writes. The ability to aggregate decrefs was sharply limited when using the decref bin, though, as decrefs were not sorted and considerable resources were required to achieve just a small amount of aggregation.

The use of tablets creates new challenges, however. In the prior scheme, each page fetched from the decref bin contained an approximately equal number of decrefs, meaning that background jobs that processed decrefs could complete within predictable amounts of time. Predictable workloads in these jobs can be valuable as they reduce the need to accommodate sudden increases in demand, which can require overprovisioning of computing resources, as well as sudden decreases in demand, which can result in underutilization of provisioned computing resources.

But the number of decrefs stored in tablets is not predictable. Some buckets within the tablets can be full, whereas others can be empty, or nearly empty. Also, the use of tablets introduces the additional factor of aggregation. What is needed, therefore, is a way of leveling the workload of background jobs that process decrefs from tablets, without interfering with the ability to aggregate over arbitrarily large numbers of tablets.

The above need is addressed at least in part with an improved technique of managing reference-count decrements (decrefs). The technique includes arranging decref jobs to process a constant, or nearly constant, number of decrefs per job. A decref job begins with a specified set of bucket identifiers common to multiple tablets across an aggregation domain and processes decrefs from the specified bucket identifiers until a target number of decrefs has been reached, continuing to additional bucket identifiers as needed.

Advantageously, the improved technique provides a consistent workload for decref jobs, even though the numbers of decrefs in different buckets can vary substantially. Also, the improved technique can typically level the workload of decref jobs without impacting aggregation, which is allowed to vary independently of the workload per decref job.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 190.

In an example, the storage 190 includes multiple storage regions. These include a data region 192 for storing user data, a metadata region 194 for storing system metadata, and a dedicated decref tier 196, for storing tablets 150, described below. The metadata stored in the metadata region 194 may include virtual blocks 194a, which contain reference counts 194b.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, an array of in-memory buckets 140 and multiple persistent tablets 150 (e.g., 150-1 through 150-M), which form an aggregation domain 160 and may be backed by the decref tier 196. The memory 130 further includes a scheduler 170, a decref job 180, and other background (BG) jobs 180a.

The array of in-memory buckets 140 includes multiple buckets 142 having respective bucket identifiers B1 through BN, where N is a positive integer. Each bucket 142 is arranged to receive decrefs (D) 154 for a respective set of virtual-block pages 194a. For example, each virtual-block page 194a has a logical identifier (LI), such as an LBA (Logical Block Address), and virtual-block pages 194a are assigned to buckets 142 based on LI (e.g., based on hash of LI). Typically, each bucket 142 contains decrefs 154 for multiple LIs, which may be arranged in a tree structure organized by LI. Each time the storage system produces a decref 154 pursuant to some activity, such as a delete, the storage system identifies the LI of the affected virtual-block page 194a, hashes the LI, and identifies the bucket 142 dedicated to the hash range that includes the hashed LI. The system then stores the decref 154 in the identified bucket.

In some examples, which are not intended to be limiting, the array of in-memory buckets 140 includes two separate arrays (not shown) of in-memory buckets, an active array that receives new decrefs 154 and a frozen array that was previously active but is now frozen. Once the active array becomes full, or in some cases sooner, the storage system freezes the active array so that it becomes the frozen array and clears the frozen array so that it becomes active. The newly-frozen array is then converted to a tablet, e.g., by copying the decrefs from the in-memory buckets 142 to corresponding persistent buckets 152 in a persistent tablet 150. A new persistent tablet 150 may be created upon each conversion operation, which may correspond to each active-frozen switch. Tablets 150 thus contain decrefs 154 accumulated by the in-memory buckets 140 during respective intervals of time, with each tablet 150 reflecting the decrefs at the point in time when an active array of tablets became frozen.

Each of the tablets 150 contains an array of buckets 152 having bucket identifiers B1 through BN, which correspond, one-to-one, to the bucket identifiers of the in-memory buckets 140. The tablets 150 thus reflect the same sorting that was used when first placing decrefs 154 into the in-memory buckets 140. Corresponding buckets having the same bucket identifier may be referred to herein as a "column" 154 of buckets. Because of the way that decrefs are assigned to in-memory buckets 140, aggregation of decrefs for virtual-block pages 194a is possible only within columns 154 but not between columns 154.

In example operation, the storage system 116 accumulates decrefs 154 in the in-memory buckets 140 and converts the in-memory buckets 140 to persistent tablets 150 at respective points in time (T1, T2, . . . , TN). The storage system may define the aggregation domain 160 as the desired number of tablets 150 over which the storage system may aggregate decrefs, in this case, M tablets. Once the M tablets have been created, the scheduler 170 starts the decref job 180, which is configured to destage 166 a target number 182 of decrefs from the tablets 150-1 through 150-M.

Preferably, the decref job 180 destages (166) decrefs column 154 by column 154. For example, the decref job 180 may start with the B1 column, counting all the decrefs for each LI in buckets B1 down all tablets 150-1 through 150-M. Once the decref job 180 reaches the end of a column (e.g., bucket B1 in tablet 150-1), the decref job 180 may destage (166) the accumulated decrefs 154 from that column to storage 190. For example, the decref job may create a merged bucket 162, which includes the total number of decrefs for each LI tracked in the B1 column. The decref job 180 may then perform a read-modify-write operation 164, which includes reading from storage 190 a virtual-block page 194a for each LI in the merged bucket 182, updating the reference count 194b for each virtual-block page 194a based on the aggregated decrefs for that virtual-block page, and writing the virtual-block page 194a back to storage 190.

If the total number of decrefs counted in the B1 column has reached the target number 182, then the decref job 180 may stop, having achieved its aim. Typically, though, the decref job 180 will not reach the target number 182 until it has processed multiple columns 154. In such cases, the decref job 180 may go on to the next column, e.g., the B2 column, and begin processing decrefs from there, counting decrefs as it goes. Once the decref job 180 reaches the end of the B2 column, the decref job 180 performs another destage operation 166, by creating another merged bucket 162 and performing another read-modify write operation164, proceeding this way column-by-column until the target number 182 has been reached.

Once the decref job 180 has completed, the scheduler 170 may start another decref job, fitting it in along with other background jobs 180a. Each additional decref job may process the same target number 182 of decrefs. In some examples, the target number 182 may be adjusted as circumstances change, but the fact that the target number 182 is consistent ensures that decref processing occurs smoothly, helping the storage system to avoid sudden spikes in demand for resources as well as sudden dips, and improving efficiency.

Figure 2:
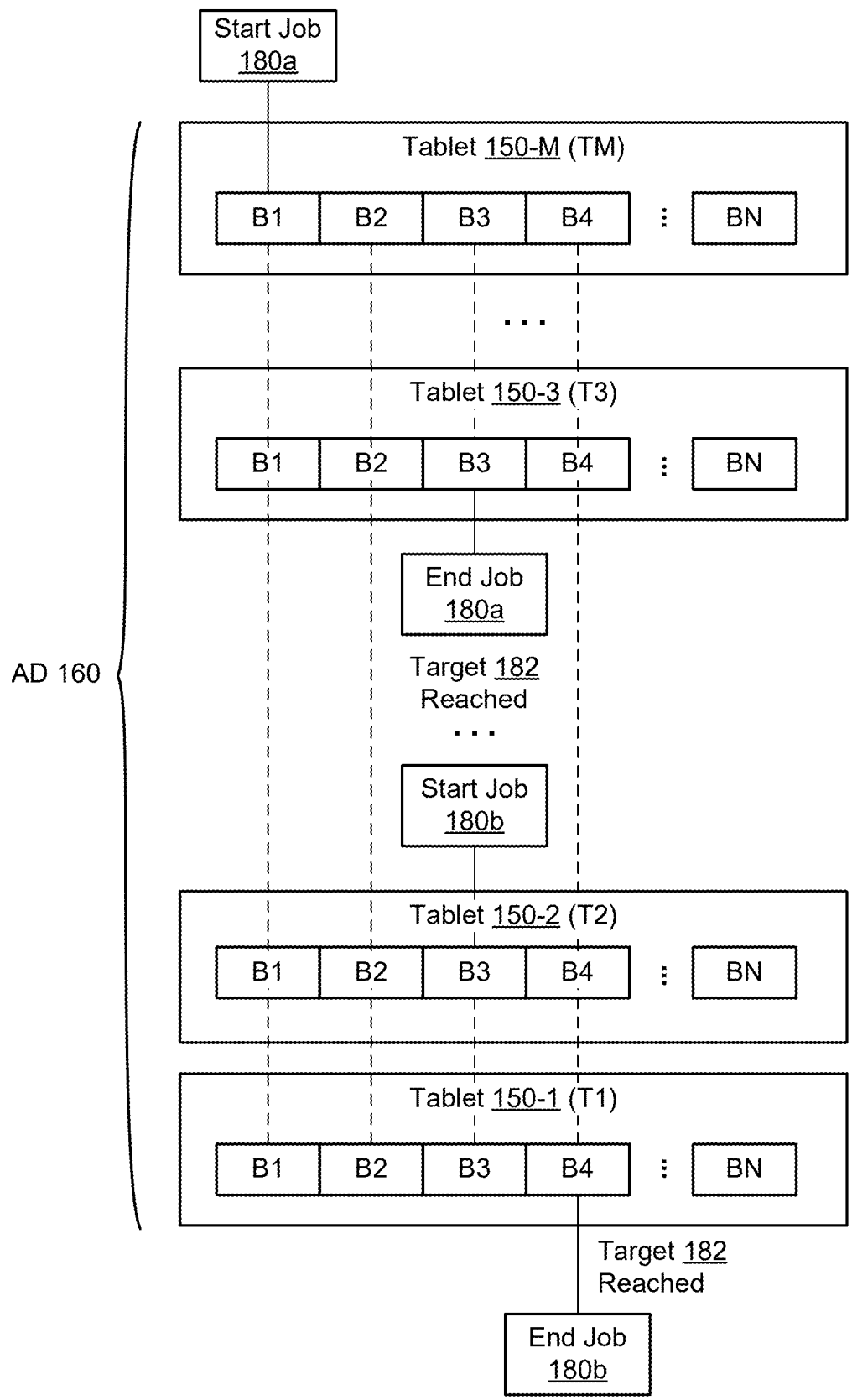
FIG. 2 is a block diagram showing an example arrangement in which a decref job is completed before completely processing a column of buckets.

FIG. 2 shows an example in which the decref job 180 reaches the target number 182 of decrefs before reaching the end of a column 154. As shown, a first decref job 180a begins processing decrefs in the B1 column, completing the column and performing a destage operation 166. But since the target number 182 has not yet been reached, the first decref job 180a proceeds to the B2 column, and then to the B3 column. Upon counting the decrefs in bucket B3 of tablet 150-3, the first decref job 180a reaches the target number 182, but this occurs before processing the entire B3 column.

In this example, the first decref job 180a performs a destage operation 166 based on buckets B3 in tablets 150-3 to 150-M only. The first decref job 180a thus processes the target number 182 of decrefs and stops there.

Sometime later, when resources become available, the scheduler 170 starts a second decref job 180b. Job 180b picks up where job 180a left off, at bucket B3 of tablet 150-2. Job 180b proceeds to the end of the B3 column and performs another destage operation 166. But having not yet reached the target number 182, job 180b proceeds to the B4 column, in this case reaching the target number 182 at the end of the B4 column, whereupon another destage operation 166 is performed.

In the example of FIG. 2, aggregation is slightly reduced, given that two different read-modify-write operations 164 are performed when processing the B3 column. However, the number of columns processed before reaching the target number 182 is typically larger than two or three, such that the impact on aggregation (and thus flash wear) tends to be small.

Figure 3:
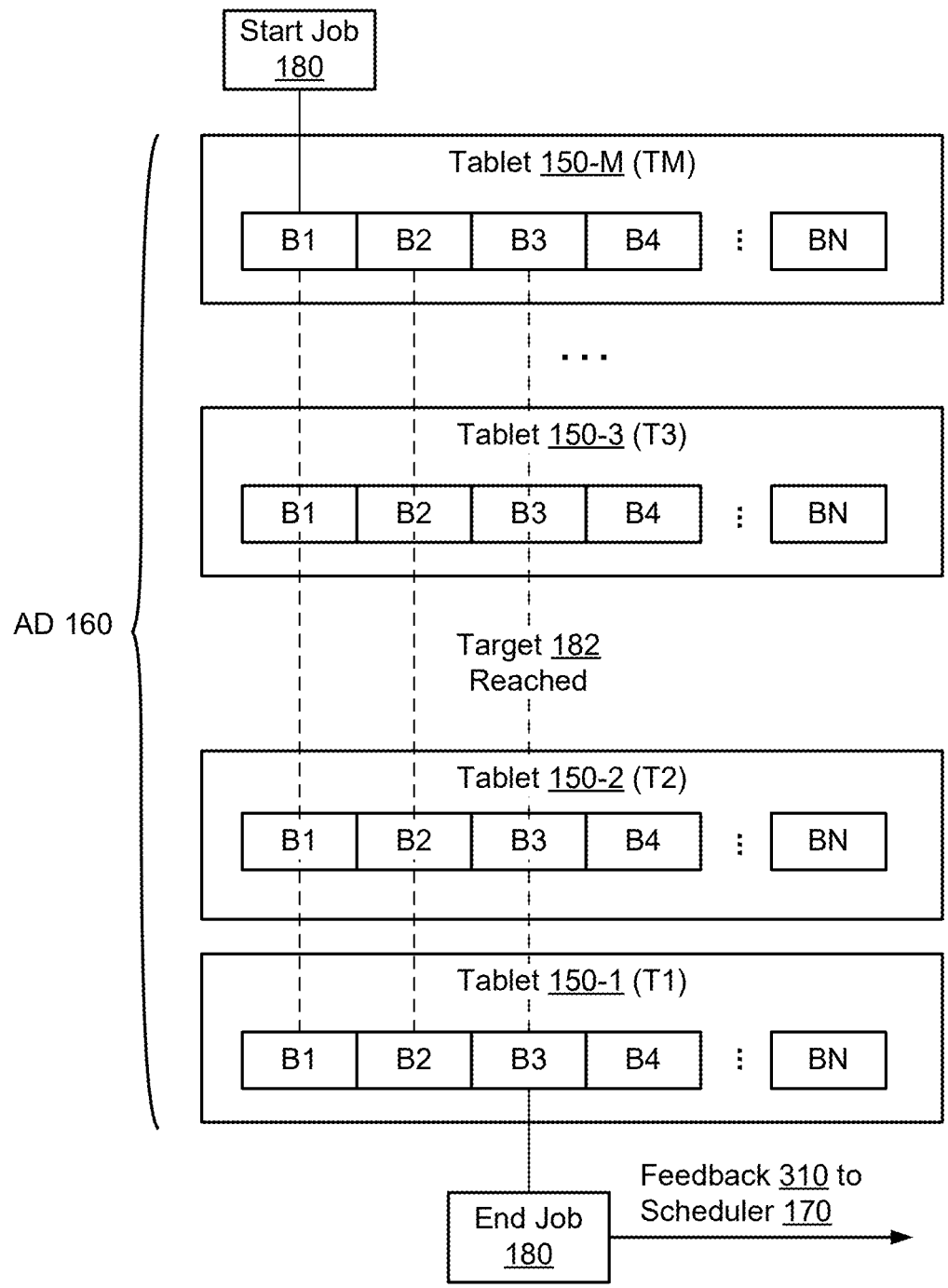
FIG. 3 is a block diagram showing an example arrangement in which a decref job is completed upon completely processing a column of buckets, but after exceeding a target number of decrefs.

FIG. 3 shows another way of proceeding when the decref job 180 reaches the target number 182 of decrefs before reaching the end of a column 154. The FIG.-3 example avoids the decrease in aggregation found in the FIG.-2 example, but at the cost of slightly less consistency in the number of decrefs processed per job.

Here, the decref job 180 starts at the top of the B1 column and proceeds to the B2 column and then to the B3 column, performing a destage operation 166 at the end of each column. As before, the target number 182 of decrefs is reached after processing the B3 bucket in tablet 150-3. But rather than stopping there, the decref job 180 continues processing decrefs until it reaches the end of the B3 column. The decref job 180 has thus exceeded the target number 182. In an example, the decref job 180 accounts for this overage by providing feedback 310 to the scheduler 170, informing the scheduler 170 of the excess decrefs that were processed. The scheduler 170 may then compensate by reducing the number of decrefs to be processed by a future decref job, e.g., by the number of excess decrefs.

Figure 4:
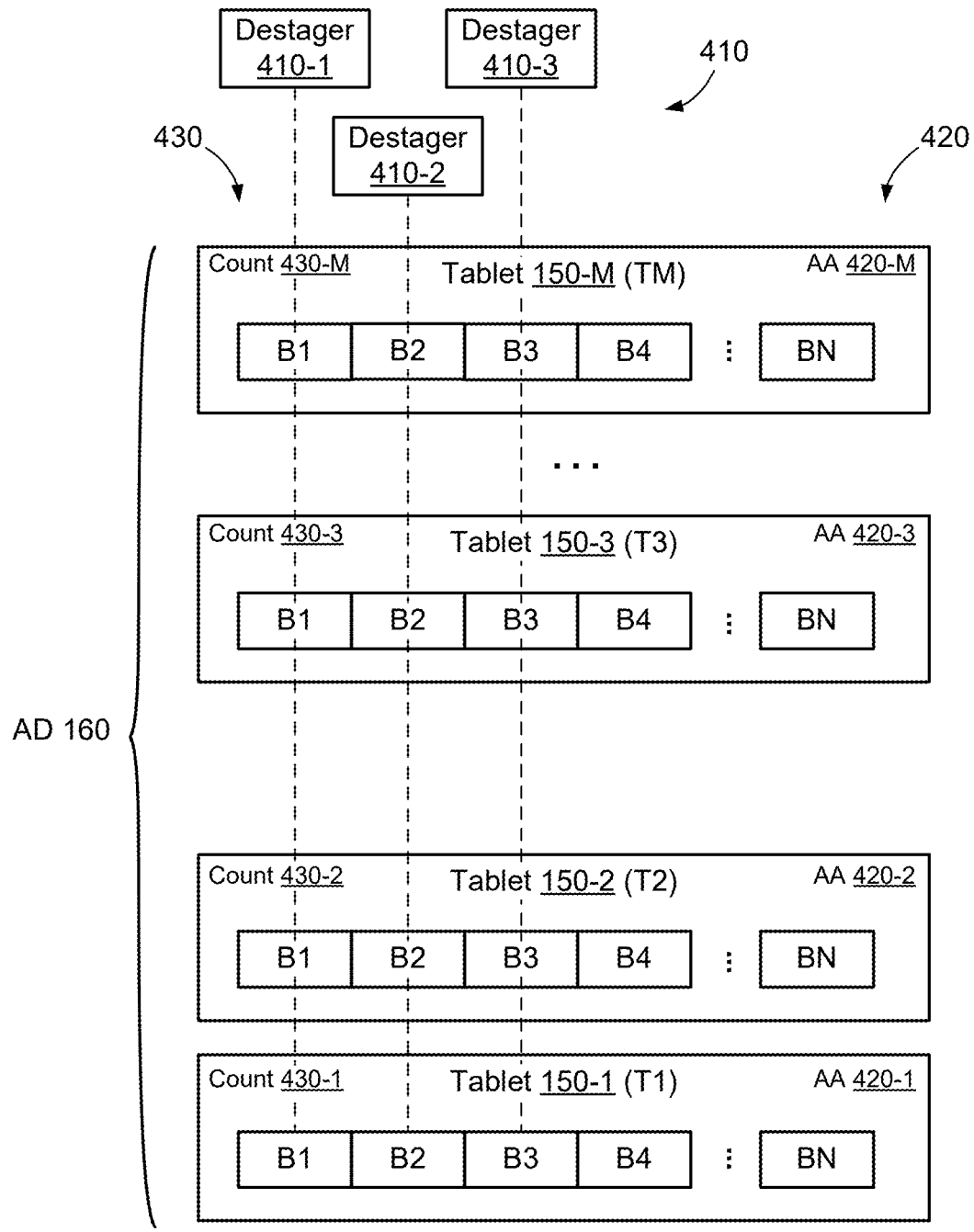
FIG. 4 is a block diagram showing an example arrangement in which a decref job is completed by multiple destagers operating on respective columns of buckets.

FIG. 4 shows yet another example. Here, the decref job 180 may be performed by multiple destagers 410 running in parallel. For example, the decref job 180 may assign destagers 410-1 through 410-3 to respective columns B1 to B3. In an example, the decref job 180 staggers operation of the destagers 410-1 through 410-3 such that the second destager 410-2 starts after the first destager 410-1 has finished counting the decrefs in the B1 column. Likewise, the third destager 410-3 starts after the second destager 410-2 has finished counting the decrefs in the B2 column. This approach avoids a situation in which the target number 182 is reached with multiple columns being partially counted. A variety of parallel processing arrangements are contemplated, and the one described above is just an example.

In an example, the tablets 150 each store certain tracking data on a per-tablet basis, such as average amortization (AA) 420 (420-1 through 420-M) and total counts 430 (430-1 through 430-M). Although first shown in FIG. 4, the same tracking data may be provided in any of the above-described examples.

In an example, average amortization 420 reflects an average number of decrefs aggregated per virtual block (LI) within a tablet. For example, an average amortization 420 of two for a tablet means that, on average, two decrefs have been recorded for each virtual block represented in the tablet. As will be described, average amortization 420 can be used in determining an optimal size of the aggregation domain 160. For example, a larger aggregation domain 160 may be provided when average amortization 420 is low, as more tablets are needed to make up for the low average. Likewise, a smaller aggregation domain 160 may be provided when average amortization 420 is high, as fewer tablets are needed. In an example, average amortization 420 is computed based on decrefs written to the in-memory buckets 140 and is propagated to the tablets 150 when they are created.

In an example, counts 430 reflect the total number of decrefs counted per bucket within a tablet 150. Counts 430 can thus assist the decref job 180 in counting decrefs as it proceeds through the buckets 152. Counts 430 may also be accumulated upon ingest of decrefs into the in-memory buckets 140. One should appreciate that counts 430 may be provided as an optimization but are not required, as the decref job 180 may simply count decrefs as it proceeds.

Figure 5:
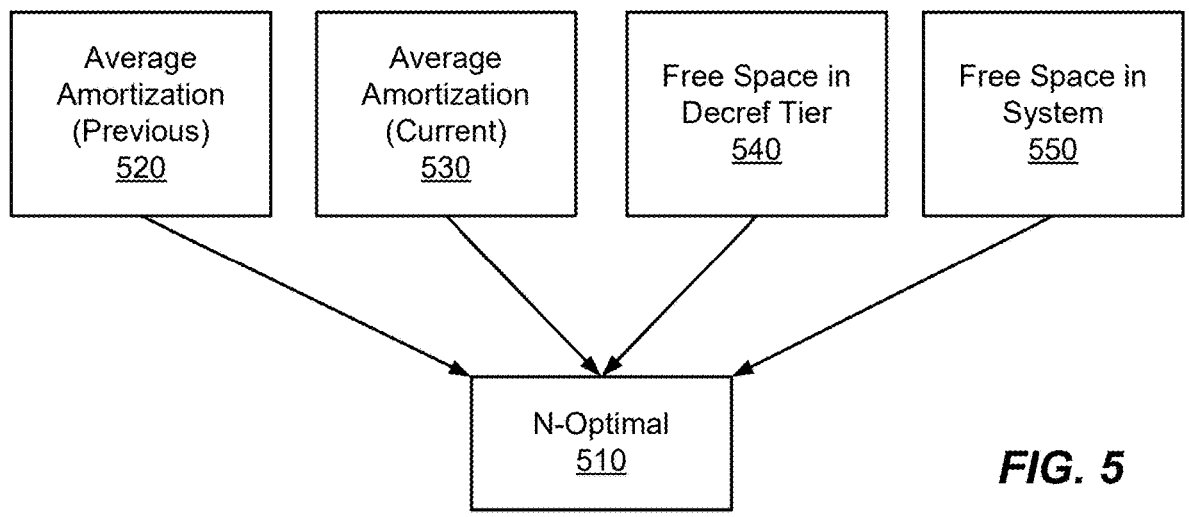
FIG. 5 is a block diagram showing example factors that contribute to a determination of an aggregation-domain size.

FIG. 5 shows example factors that contribute to a determination of N-Optimal 510, which represents an optimal number of tablets 150 in the aggregation domain 160. Because each decref job 180 is arranged to process the target number 182 of decrefs, the number of tablets 150 in the aggregation domain 160 is allowed to vary without being constrained by the operation of decref jobs.

As shown, one factor that contributes to N-Optimal 510 is the average amortization 520 of one or more previous batches of tablets. Such average amortization may be based on the per-tablet average amortization 420 described above. The previous batches are tablets that were processed in previous amortization domains 160. In some examples, time-series analysis may be used to predict N-optimal based on a series of previous amortization domains.

Another factor that contributes to N-Optimal 510 is the average amortization 520 within a current batch of tablets. For example, the average amortization 420 of tablets may be monitored as new tablets are created and added to a current aggregation domain. Once a desired level of aggregation is reached, the current aggregation domain may be closed off and decref processing on that aggregation domain may begin.

Yet another factor that contributes to N-Optimal 510 is the amount of free space 530 in the decref tier 196. For example, if free space in the decref tier 196 is running low, the storage system may benefit from fewer tablets in the aggregation domain and from processing decrefs from those tablets more quickly, as doing so will avoid an out-of-space condition in the decref tier.

An additional factor that contributes to N-Optimal 510 is the amount of free space 540 in the storage system 116. A central reason for processing decrefs is to identify virtual blocks whose reference counts 194b have fallen to zero, as the physical blocks pointed to by such virtual blocks can be reclaimed, creating additional free space in the storage system. Thus, free space running low in the storage system can mean that the number of tablets in the aggregation domain 160 should be kept small, so that decref processing can proceed promptly, allowing more free space to be created.

The storage system preferably balances the factors 520, 530, 540, and 550 to arrive at an optimal number (N-Optimal) of tablets in the aggregation domain 160. Such balancing may involve combinatorial logic or machine learning, for example.

Figure 6:
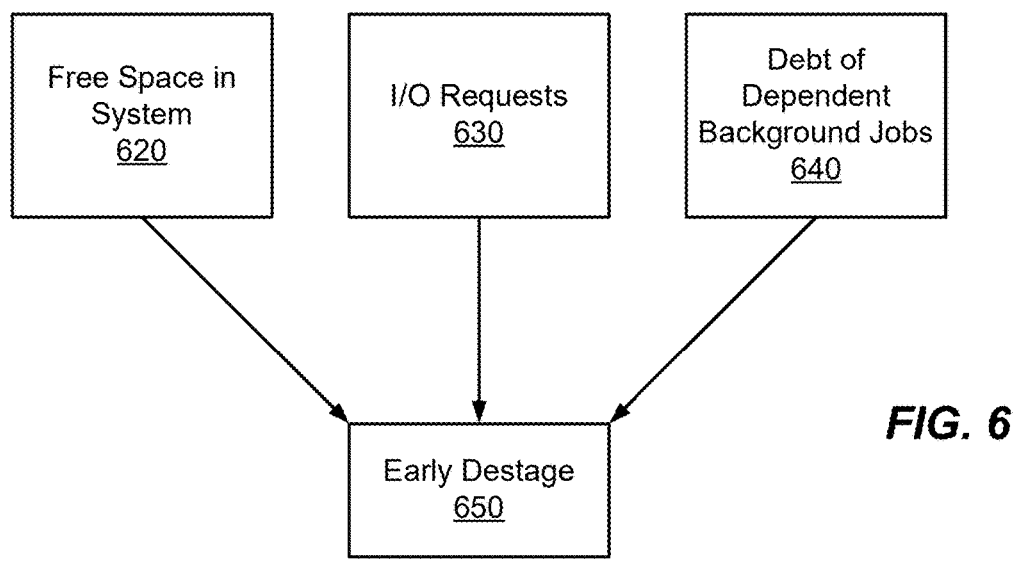
FIG. 6 is a block diagram showing example factors that contribute to an early destaging of decrefs prior to reaching a desired aggregation-domain size.

FIG. 6 shows example factors that contribute to early destaging 650 from an aggregation domain 160 before a desired number of tablets has been created. Such early destaging may also be referred to herein as an "unordered trigger," and indicates some circumstances that merit or require immediate destaging, i.e., processing of decrefs from existing tablets by decref jobs 180.

One factor that contributes to early destaging 650 is low free space 620 in the storage system 116. As described above, decref processing helps to create more free space. Thus, for example, if free space falls below some low-water mark, such as 5%, 10%, or 15% of capacity, early destaging 650 may be triggered to avoid an out-of-space condition. This may occur even though fewer than the desired number of tablets (N-Optimal) has been created.

Another factor that contributes to early destaging 650 is detecting 630 that host I/O requests 112 are idle. For example, if CPU cores that handle I/O requests 112 are idle for some determined interval of time (e.g., 10 seconds, 20 seconds, etc.), the available capacity from those CPU cores can be used instead for running decref jobs 180. This arrangement reduces processing debt and may be preferred, even though it may mean less-than-optimal decref aggregation.

An additional factor that contributes to early destaging is detecting 640 that processing debt of other background jobs 180a exceeds some high-water mark. This is particularly the case for background jobs 180a that depend upon decref processing, such as decref-to-zero activities and storage reclaim.

Figure 7:
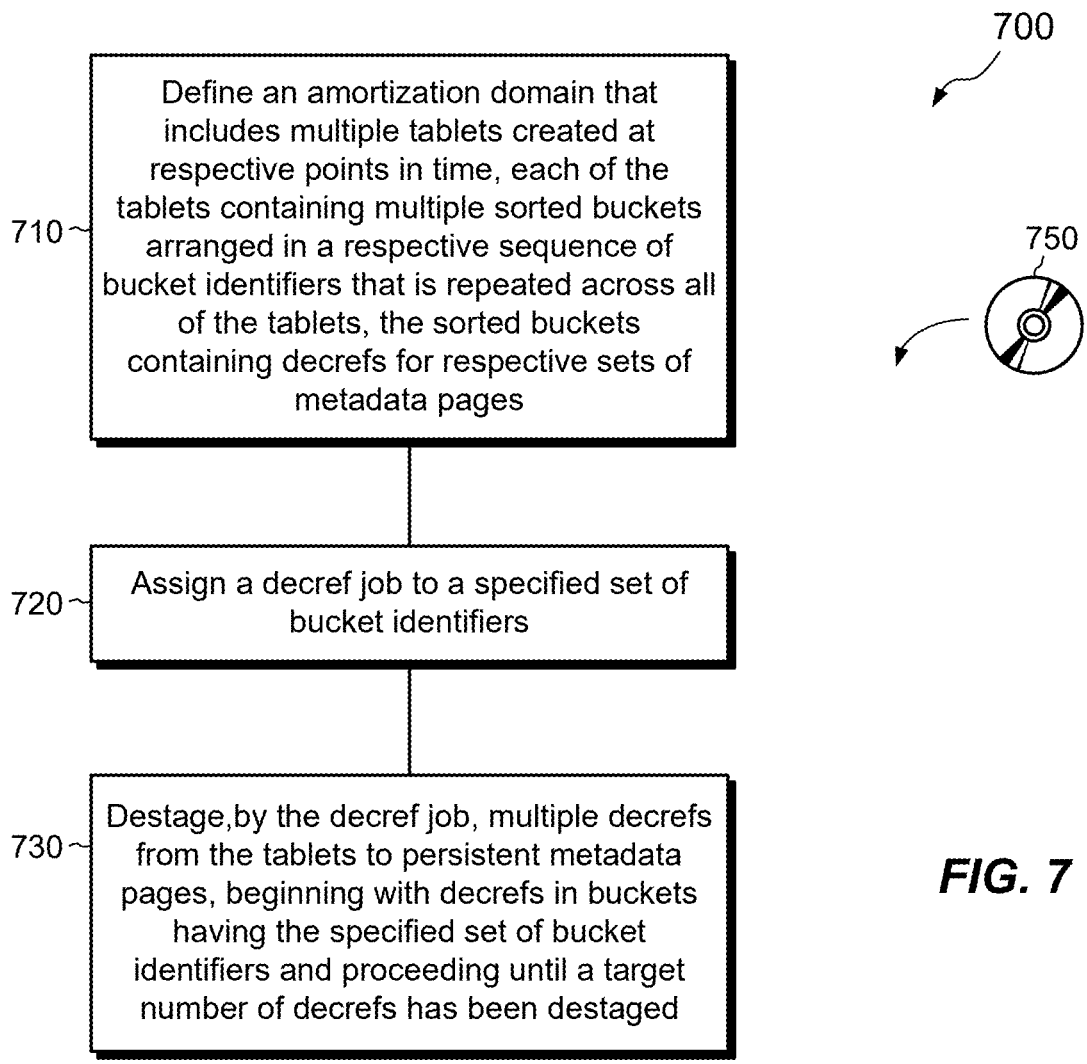
FIG. 7 is a flowchart showing an example method of managing decrefs.

FIG. 7 shows an example method 700 that may be carried out in connection with the environment 100 and provides an overview of some of the features described above. The method 700 is typically performed, for example, by the software constructs described in connection with FIG. 1, which reside in the memory 130 of a node 120 and are run by the set of processors 124. The various acts of method 700 may be ordered in any suitable way. Accordingly, embodiments may be constructed in which acts are performed in orders different from that illustrated, which may include performing some acts simultaneously.

At 710, an amortization domain 160 is defined that includes multiple tablets 150 created at respective points in time (e.g., T1, T2, . . . TM). Each of the tablets 150 contains multiple sorted buckets 152 arranged in a respective sequence of bucket identifiers (e.g., B1 through BN) that is repeated across all of the tablets 150. The sorted buckets 152 contain decrefs 154 for respective sets of metadata pages 194a.

At 720, a decref job 180 is assigned to a specified set of bucket identifiers (e.g., one or more columns 154), such as the B1 column, the B1 column through the B3 column, or the like.

At 730, the decref job destages 166 multiple decrefs 154 from the tablets 150 to persistent metadata pages 194a, beginning with decrefs 154 in buckets 152 having the specified set of bucket identifiers and proceeding until a target number 182 of decrefs has been destaged.

In some examples, the method 700 may be embodied as a computer program product including one or more non-transient, computer-readable storage media 750, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

An improved technique has been described for managing reference-count decrements (decrefs) 154. The technique includes arranging decref jobs 180 to process a constant, or nearly constant, number of decrefs per job. A decref job 180 begins with a specified set of bucket identifiers (one or more columns 154) common to multiple tablets 150 across an aggregation domain 160 and processes decrefs 154 from the specified bucket identifiers until a target number 182 of decrefs has been reached, continuing to additional bucket identifiers (columns) as needed. Advantageously, the improved technique provides a consistent workload for decref jobs, even though the numbers of decrefs in different buckets can vary substantially. Also, the improved technique can typically level the workload of decref jobs without impacting aggregation, which is allowed to vary independently of the workload per decref job.

Having described certain embodiments, numerous alternative embodiments or variations can be made. For example, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Further, although the term "user" as used herein may refer to a human being, the term is also intended to cover non-human entities, such as robots, bots, and other computer-implemented programs and technologies. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing reference-count decrements (decrefs), comprising:
    defining an aggregation domain that includes multiple tablets created at respective points in time, each of the tablets containing multiple sorted buckets arranged in a respective sequence of bucket identifiers that is repeated across all of the tablets, the sorted buckets containing decrefs for respective sets of metadata pages;
    assigning a decref job to a specified set of bucket identifiers; and
    destaging, by the decref job, multiple decrefs from the tablets to persistent metadata pages, beginning with decrefs in buckets having the specified set of bucket identifiers and proceeding until a target number of decrefs has been destaged.

2. The method of claim 1, wherein destaging multiple decrefs from the tablets includes:
    merging decrefs from buckets having a particular bucket identifier across at least some of the tablets; and
    updating one or more metadata pages based on the merged decrefs.

3. The method of claim 2, wherein the decref job is a first decref job, and wherein merging decrefs from the buckets having the particular bucket identifier includes:
    ending the first decref job after merging fewer than all buckets having the particular bucket identifier, in response to the target number of decrefs being reached; and
    starting a second decref job configured to merge remaining buckets having the particular bucket identifier that were not merged by the first decref job.

4. The method of claim 1, wherein destaging, by the decref job, multiple decrefs from the tablets includes completely destaging decrefs from all buckets for each bucket identifier processed by the decref job.

5. The method of claim 4, wherein completely destaging all decrefs for each bucket identifier processed by the decref job causes the target number of decrefs to be exceeded, and wherein the method further comprises providing feedback to a system scheduler, the feedback indicating a number of decrefs actually destaged by the decref job and enabling the scheduler to compensate when scheduling future jobs.

6. The method of claim 1, wherein the set of bucket identifiers includes a plurality of bucket identifiers, and wherein destaging, by the decref job, multiple decrefs includes operating multiple destagers in parallel.

7. The method of claim 1, further comprising tracking an average aggregation of decrefs for each tablet and adjusting the number of tablets in the aggregation domain to achieve a desired level of aggregation.

8. The method of claim 1, wherein the aggregation domain includes a number of tablets that is determined based at least in part on an average aggregation of decrefs achieved during one or more previous destaging operations of previously created tablets.

9. The method of claim 8, wherein the number of tablets in the aggregation domain is further based at least in part on an amount of free space in a decref storage tier configured to store tablets awaiting destaging.

10. The method of claim 8, wherein the method is operated in a data storage system, and wherein the number of tablets in the aggregation domain is further based at least in part on an amount of free space in the data storage system.

11. The method of claim 1, wherein the method is operated in a data storage system, and wherein the method further comprises:
    establishing a desired number of tablets in the aggregation domain; and
    before the desired number of tablets has been created, triggering an early destage from the tablets already created, based on a condition of the data storage system.

12. The method of claim 11, wherein the condition of the data storage system includes host I/O requests received by the data storage system being idle.

13. The method of claim 11 wherein the early-destage is triggered based at least in part on an amount of free storage space in the data storage system falling below a low-water mark.

14. The method of claim 11, wherein the data storage system runs a set of other background jobs that have dependencies on the decref job, and wherein the early-destage is triggered based at least in part on an amount of processing debt from the set of other background jobs exceeding a high-water mark.

15. A computerized apparatus, comprising control circuitry that includes a set of processors coupled to memory, the control circuitry constructed and arranged to:
    define an aggregation domain that includes multiple tablets created at respective points in time, each of the tablets containing multiple sorted buckets arranged in a respective sequence of bucket identifiers that is repeated across all of the tablets, the sorted buckets containing decrefs for respective sets of metadata pages;
    assign a decref job to a specified set of bucket identifiers; and
    destage, by the decref job, multiple decrefs from the tablets to persistent metadata pages, beginning with decrefs in buckets having the specified set of bucket identifiers and proceeding until a target number of decrefs has been destaged.

16. A computer program product including a set of non-transitory, computer-readable media having instructions which, when executed by control circuitry of a computerized apparatus, cause the computerized apparatus to perform a method of managing reference-count decrements (decrefs), the method comprising:
    defining an aggregation domain that includes multiple tablets created at respective points in time, each of the tablets containing multiple sorted buckets arranged in a respective sequence of bucket identifiers that is repeated across all of the tablets, the sorted buckets containing decrefs for respective sets of metadata pages;

assigning a decref job to a specified set of bucket identifiers; and destaging, by the decref job, multiple decrefs from the tablets to persistent metadata pages, beginning with decrefs in buckets having the specified set of bucket identifiers and proceeding until a target number of decrefs has been destaged.

17. The computer program product of claim 16, wherein destaging multiple decrefs from the tablets includes:

merging decrefs from buckets having a particular bucket identifier across at least some of the tablets; and updating one or more metadata pages based on the merged decrefs.

18. The computer program product of claim 17, wherein the decref job is a first decref job, and wherein merging decrefs from the buckets having the particular bucket identifier includes:

ending the first decref job after merging fewer than all buckets having the particular bucket identifier, in response to the target number of decrefs being reached; and starting a second decref job configured to merge remaining buckets having the particular bucket identifier that were not merged by the first decref job.

19. The computer program product of claim 16, wherein the method further comprises tracking an average aggregation of decrefs for each tablet and adjusting the number of tablets in the aggregation domain to achieve a desired level of aggregation.

20. The computer program product of claim 16, wherein the method is operated in a data storage system, and wherein the method further comprises:

establishing a desired number of tablets in the aggregation domain; and before the desired number of tablets has been created, triggering an early destage from the tablets already created, based on a condition of the data storage system.

* * * * *